United States Patent [19]

Crivello

[11] Patent Number: 5,886,115
[45] Date of Patent: Mar. 23, 1999

[54] PROCESS FOR THE DIRECT POLYMERIZATION OF ALLYL ETHERS, CROTYL ETHERS AND ALLYL ALCOHOLS

[75] Inventor: James V. Crivello, Clifton Park, N.Y.

[73] Assignee: Rensselaer Polytechnic Institute, Troy, N.Y.

[21] Appl. No.: 801,952

[22] Filed: Feb. 18, 1997

[51] Int. Cl.[6] .................................. C08F 4/06; C08F 4/42
[52] U.S. Cl. ........................... 526/126; 526/128; 526/194
[58] Field of Search .................................... 526/194, 128, 526/126

[56] References Cited

U.S. PATENT DOCUMENTS 3,700,707 10/1972 Durst et al. .......................... 260/429.5
5,412,054 5/1995 Crivello et al. ............................ 528/15

FOREIGN PATENT DOCUMENTS 1090122 3/1965 United Kingdom .

Primary Examiner—Frederick Krass
Attorney, Agent, or Firm—Heslin & Rothenberg, P.C.

[57] ABSTRACT

A process for the direct polymerization of allyl ethers, crotyl ethers and allyl alcohols is disclosed. The process comprises bringing into reactive proximity an allyl ether, crotyl ether or allyl alcohol compound; a transition metal carbonyl complex catalyst; and a cocatalyst bearing at least one silicon-hydrogen bond. Preferably, the catalyst is a cobalt carbonyl complex, and most preferably, the catalyst is dicobalt octacarbonyl. While virtually any compound bearing at least one silicon-hydrogen bond can be used as cocatalyst, phenylsilane is the most preferred. The process promotes the polymerization of allyl alcohols, mono-, di-, tri-, tetra- and multifunctional allyl and crotyl ether monomers, as well as terminal and pendent allyl and crotyl ether functional groups within oligomers and polymers.

15 Claims, No Drawings

PROCESS FOR THE DIRECT POLYMERIZATION OF ALLYL ETHERS, CROTYL ETHERS AND ALLYL ALCOHOLS

TECHNICAL FIELD

This invention relates generally to the production of polymers and, more specifically to a process for the direct polymerization of allyl ethers, crotyl ethers and allyl alcohols. The process utilizes a transition metal carbonyl complex catalyst and a cocatalyst bearing at least one silicon-hydrogen bond.

BACKGROUND OF THE INVENTION

It is well known that allyl and crotyl ethers do not readily undergo either free radical or cationic polymerization and thus, they have only very limited value as monomers for the production of polymers. This is unfortunate since compounds containing allyl or crotyl ether groups are readily prepared, using simple chemistry, and are potentially quite inexpensive.

Motivated by the potential utility of these unsaturated compounds for the production of polymeric products, we have demonstrated that allyl ethers can be isomerized to yield 1-propenyl ethers and that crotyl ethers can be isomerized to give 1-butenyl ethers. The 1-propenyl ethers and 1-butenyl ethers that are the products of these isomerizations can then be made to undergo cationic photopolymerization, but to date, none of the known catalyst systems have been effective for the direct polymerization of allyl or crotyl ethers.

Therefore, there is a need for an efficient and economical process for the direct polymerization of readily prepared and relatively inexpensive allyl and crotyl ethers.

SUMMARY OF THE INVENTION

The present invention provides an efficient and economical process for the direct polymerization of allyl ethers, crotyl ethers and allyl alcohols. The process comprises bringing into reactive proximity an allyl ether, crotyl ether or allyl alcohol compound; a transition metal carbonyl complex catalyst and a cocatalyst bearing at least one silicon-hydrogen bond. The compounds are mixed at a temperature sufficient to induce polymerization of the compound. The polymerization reaction generally ensues rapidly and exothermically at room temperature. Preferably, the transition metal carbonyl complex catalyst is a cobalt carbonyl complex and most preferably, is dicobalt octacarbonyl. While virtually any compound bearing at least one silicon-hydrogen bond can function as cocatalyst, phenylsilane is most preferred.

The present invention also provides a curable composition kit comprised of a compound having at least one allyl ether, crotyl ether or allyl alcohol functional group; a transition metal carbonyl complex catalyst and a cocatalyst bearing at least one silicon-hydrogen bond.

Numerous other advantages and features of the present invention will become readily apparent from the following detailed description of the preferred embodiment and the appended claims.

DETAILED DESCRIPTION OF THE PREFERRED EMBODIMENT

Although this invention is susceptible to embodiment in many different forms, preferred embodiments of the invention are shown. It should be understood, however, that the present disclosure is to be considered as an exemplification of the principles of this invention and is not intended to limit the invention to the embodiments illustrated.

The present invention discloses that allyl ethers, crotyl ethers and allyl alcohols can be readily and efficiently polymerized utilizing a process comprising bringing into reactive proximity an allyl ether, crotyl ether or allyl alcohol; a transition metal carbonyl complex catalyst; and a cocatalyst bearing at least one silicon-hydrogen bond. The polymerization reaction ensues spontaneously and exothermically simply upon mixing the allyl ether, crotyl ether or allyl alcohol compound, the catalyst and the cocatalyst.

The general structures shown below are representative of the wide variety of allyl and crotyl ethers that can be polymerized using this novel process.

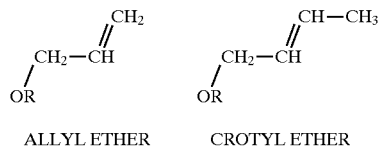

ALLYL ETHER      CROTYL ETHER wherein R may be aliphatic, chlorinated aliphatic, fluorinated aliphatic, cycloaliphatic, heterocyclic or arylalkyl.

The present invention applies not only to monofunctional allyl and crotyl ethers, but also to di-, tri-, tetra- and multifunctional allyl and crotyl ethers, which upon polymerization yield crosslinked polymers. Useful polymeric compounds can also be efficiently and readily obtained from polymers and oligomers bearing allyl or crotyl ether terminal and/or pendant groups.

Examples of allyl and crotyl ethers that are polymerizable with this novel process include, but are not limited to, allyl butyl ether, n-octyl allyl ether, n-decyl allyl ether, n-dodecyl allyl ether, benzyl allyl ether, ethylene glycol diallyl ether, 3,4-dihydropyran, 3,4-dihydrofuran, crotyl butyl ether, cyclohexyl allyl ether, propyleneglycol triallyl ether, diethyleneglycol diallyl ether, furfurylallyl ether, neopentylglycol diallyl ether, triethylene glycol diallyl ether, tetraethylene glycol diallyl ether, 1,2,3-triallyloxypropane, trimethylolpropane triallyl ether, pentaerythritol tetrallyl ether, sorbitol hexaallyl ether, 1,2,3-tricrotyloxypropane, pentaerythritol tetracrotylether and trimethylolpropane tricrotyl ether. These monomers may be polymerized singly or in combination to produce copolymers.

The process of the present invention can also be used to facilitate the simultaneous induction of allyl ether polymerizations and ring-opening polymerizations. For example, allyl glycidyl ether can be polymerized at both the allyl ether and the epoxide group to yield a network polymer. Other examples include allyl tetrahydrofurfuryl ether and epoxycylcohexylmethyl allyl ether. In addition, a series of unique interpenetrating network polymers are the result of the simultaneous polymerization of difunctional allyl ethers and difunctional epoxides.

Unique polymeric compounds are also produced by the polymerization of multifunctional vinyl ethers and multifunctional allyl ethers. Thus, it is evident that the incorporation of an allyl or crotyl ether functional group into a wide variety of molecular structures can present monomers which are polymerizable according to the process of the present invention.

Examples of such molecular structures include monofunctional monomers, such as

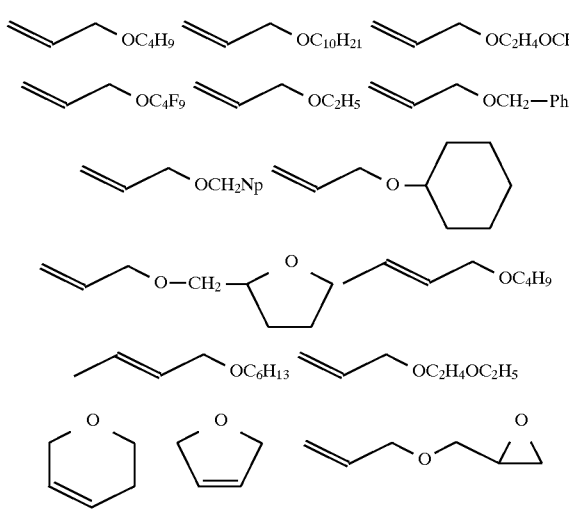

multifunctional monomers, such as

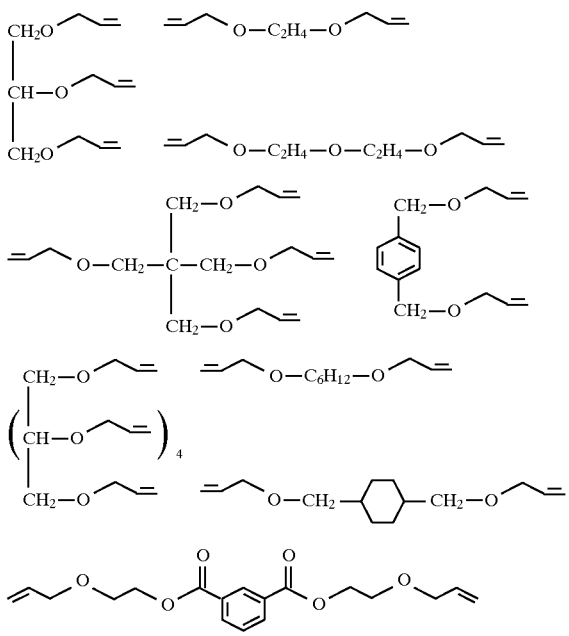

and polymers and oligomers, such as

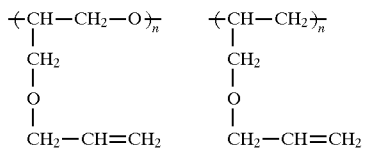

As previously indicated, compounds containing allyl alcohol functional groups may also be polymerized using the the process of the present invention. As with the polymerization of allyl ethers and crotyl ethers, the process induces the rapid and exothermic polymerization of virtually any compound containing an allyl alcohol functional group.

Examples of typical structures for allyl alcohols include

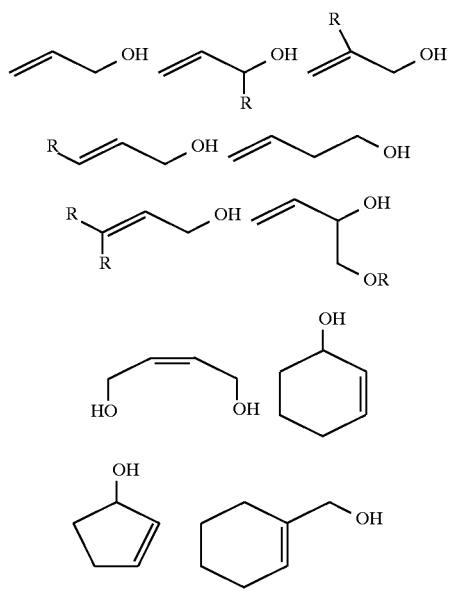

wherein R may be H, alkyl, aryl, alkoxy and halo.

The principles of the present invention may be illustrated by the following general equation:

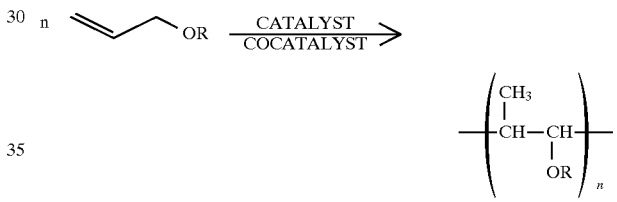

wherein the catalyst is a transition metal carbonyl complex and the cocatalyst is a compound bearing at least one silicon-hydrogen bond.

The polymerization reaction of the present invention can be induced by bringing the three components into contact. The components are optimally combined in the liquid phase either neat (when the viscosities and reaction kinetics allow) or in solution in inert solvents. Mixing is preferably accomplished in one of two modes: the three components can simply be mixed together at the same time, whereupon the reaction ensues at room temperature after a short induction period of a few seconds or, in the alternative, the catalyst and cocatalyst can be mixed together first and then the allyl ether, crotyl ether or allyl alcohol added to the mixture. In the latter case, the polymerization reaction often occurs at room temperature without an appreciable induction period.

Preferred transition metal carbonyl complex catalysts are chosen from the group consisting of carbonyl complexes of the Group VIII elements cobalt, iridium, iron, nickel, osmium, rhodium and ruthenium. The more preferred catalysts are chosen from the group consisting of $Co_2(CO)_8$ and $Co_4(CO)_{12}$, and the most preferred catalyst is dicobalt octacarbonyl, $Co_2(CO)_8$, which is the least expensive and most readily available active catalyst. When carbonyl complexes other than $Co_2(CO)_8$ are employed, polymerization is usually conducted at elevated temperatures. Heating from about 25° C. to 200° C. may be employed in such cases.

Virtually any compound bearing at least one silicon-hydrogen bond can function as cocatalyst and examples included, but are not limited to, monoalkyl and monoaryl silanes, e.g., tolylsilane, phenylsilane, n-butylsilane, i-butylsilane, n-hexylsilane, octadecylsilane, cyclohexylsilane and n-dodecylsilane; dialkyl, alkylaryl and diarylsilanes, e.g., diethylsilane, di-n-hexylsilane, di-n-butylsilane, methyl-n-butylsilane, phenylmethylsilane and diphenylsilane; dialkylaryl,trialkyl, alkyldiaryl and triarylsilanes, e.g., tri-n-butylsilane, tri-n-hexylsilane and dimethylphenylsilane; cyclic silanes, e.g., 1,3,5,7-tetramethylcyclotetrasiloxane and 1,5-hexamethyltrisiloxane; polymeric silanes, e.g., poly (methylhydrogen siloxane); and miscellaneous silanes, e.g., dichlorochloromethylsilane, triethoxysilane, 1,2,3,3-tetramethyldisiloxane, trichlorosilane, and 1,1,2,2-tetramethyldisilane. The most preferred cocatalyst is phenylsilane.

The catalyst may be present from about 0.5 to about 10,000 parts per million (ppm) by weight and the cocatalyst may be present from about 1 to about 20,000 ppm by weight, based on 100 parts by weight total weight of a curable composition containing the same. The curable composition may contain from about 0.5 to about 10,000 ppm by weight of the catalyst, from about 1 to 20,000 ppm by weight of the cocatalyst and from about 0.5 to about 100 parts by weight of the compound to be polymerized. Preferably, from about 1 to about 100 parts by weight, and most preferably, from about 5 to about 100 parts by weight of the compound to be polymerized are employed.

When the curable composition contains less than about 100 parts by weight of the compound to be polymerized, such as, for example, 90 parts by weight thereof, the balance, after the catalyst and cocatalyst, may comprise fillers, extenders, reinforcing fibers, pigments, metal powders, and solvents, as well as other such materials as is known in the art. When solvents are employed, they may be selected from among any suitable solvent or solvent system, for example, hydrocarbon solvents, such as hexane, octane, xylene and toluene may be used.

Preferably, the catalyst and cocatalyst are kept apart until the time is appropriate to conduct the polymerization. Solvent carriers may be employed for the catalyst and cocatalyst to facilitate measured additions thereof in view of the small quantities of these materials used in the curable compositions. Suitable solvents include hydrocarbons, for example, hexane, octane, xylene and preferably, toluene.

The kit of the invention comprises the reactive monomer, the transition metal catalyst and the silicon-containing cocatalyst, to which may be added some or all of the fillers, fibers, pigments, solvents etc. described above. Commonly the kit will be furnished as three containers containing the three necessary components, which will be combined by the purchaser of the kit when and where it is desired to carry out the polymerization. If fillers, fibers, pigments, solvents etc. are to be employed, they may be mixed into the monomer constituent before the components are combined, and often will be supplied as a mixture in the monomer constituent. The catalyst and cocatalyst components will usually be supplied in solution in an inert solvent to aid in manipulation. For some applications it may be possible to combine two components into one constituent of the kit, e.g. monomer plus catalyst as one constituent of the kit and cocatalyst as another, or catalyst plus cocatalyst as one constituent and monomer as another.

The polymeric compounds produced in accordance with the principles of the instant invention have a wide variety of applications. For example, the polymerization of chiefly monofunctional allyl ethers and crotyl ethers yields linear or branched polymers that can be used as coatings, adhesives, thermoplastics and fiber finishes. Other resulting polymeric compounds may be employed as electronic insulators in various electrical products, serving as bushings, standoff insulators, impregnating resins and the like.

The polymerizations of di- and multifunctional monomers yield crosslinked or thermoset, network polymers having uses in a wide array of composites such as inks, coatings, sealants and adhesives. These thermosetting compositions can also be combined with reinforcing fibers and used in the manufacture of various composite articles, such as in the fabrication of boats, automobiles, housing panels and structural support members. Similarly, the polymeric compound might also be combined with a wide assortment of particulate fillers, flow control agents, pigments and colorants, or other additives essential to impart thixotropic, flatting or improved mechanical characteristics to a finished article.

DEFINITIONS

The following terms have the indicated meanings throughout the application:

"Alkoxyl" means alkoxy groups of from 1 to 20 carbon atoms of a straight, branched or cyclic configuration. Examples of alkoxy groups include methoxy, ethoxy, propoxy, isopropoxy, cyclopropyloxy, cyclohexyloxy, and the like.

"Alkyl" is intended to include linear, branched or cyclic structures and combinations thereof from 1 to 20 carbon atoms. Examples include methyl, ethyl, propyl, isopropyl, c-propyl, butyl, c-butyl, n-butyl, i-butyl, pentyl, c-pentyl, hexyl, octyl, octadecyl, 2-methylcyclopropyl, cyclopropylmethyl and the like.

"Aryl" means aromatic derivatives of 6-membered ring structures, such as phenyl (Ph), naphthyl (Np), tolyl and the like.

"Arylalkyl" includes compounds having both alkyl and aryl structures as defined herein above, for example, benzyl, phenethyl and the like.

"Aliphatic" is intended to include saturated or unsaturated linear or branched organic structures of from 1 to 20 carbon atoms.

"Cycloaliphatic" includes saturated or unsaturated cyclic organic structures of from 1 to 20 carbons.

"Heterocyclic" means a 5- or 6-membered closed ring structure containing 1 to 3 hetero atoms selected from O, N and S.

EXAMPLES

The preferred embodiment of the present invention is hereinafter described in more detail by means of the following examples that are provided by way of illustration and not by way of limitation.

EXAMPLES 1–3

The following three examples are typical procedures which were used for polymerization of the allyl ethers with Group VIII carbonyl complexes.

Polymerization of Allyl n-Decyl Ether using $CO_4(CO)_{12}$

Into a small vial fitted with a septum was added 43 mg ($7.5\times10^{-5}$ mol) of $CO_4(CO)_{12}$ dissolved in 1.0 g (0.0050 mol) of allyl n-decyl ether. Then, 37 μL ($2.0\times10^{-4}$ mol) of diphenylsilane was injected at room temperature. The color of the reaction mixture changed from clear to brown but no polymerization was observed even after standing for 24 hours at room temperature. The vial was placed in an oil bath maintained at 110° C. Very rapid, exothermic polymerization took place after a few seconds induction period. After 1 hour at 110° C. the polymerization was cooled and terminated by injecting a small amount of triethylamine. The resulting polymer was dissolved in chloroform and analyzed by gas chromatography (GC) for residual allyl n-decyl ether with n-decane as the internal standard. A conversion of 90% was obtained. The polymer was precipitated into methanol and then redissolved in chloroform. This process was repeated three more timed and the polymer dried in vacuo. Gel permeation chromatography (GPC) determination of the molecular weight of the polymer gave $M_n$=18000 g/mol, $M_w$=26000 g/mol with a dispersity of 1.4.

Bulk Polymerization of 2,5-Dihydrofuran with $CO_4(CO)_{12}$

Into a small vial fitted with a serum cap was added 66 mg ($1.17 \times 10^{-4}$ mol) of $CO_4(CO)_{12}$ dissolved in 1.0 g (0.0078 mol) of 2,5-dihydrofuran and then 58 μL ($3.12 \times 10^{-4}$ mol) of diphenylsilane was injected by syringe. Very rapid, exothermic polymerization took place at room temperature after a few seconds induction period. After 1 hour, the polymerization was terminated by the injection of a small amount of triethylamine and the polymer dissolved in chloroform. GC analysis for residual 2,5-dihydrofuran with n-decane as an internal standard gave a conversion of 96%. The polymer was dissolved in chloroform and precipitated into hexane then recovered by filtration and dried. GPC of the polymer in cloroform gave $M_n$=6500 g/mol, $M_w$=9000 g/mol with a dispersity of 1.4.

General Procedure for the Polymerization of Allyl n-Decyl Ether with Various Metal Carbonyl Complexes Into a small vial fitted with a serum cap was added 1.0 g (0.0050 mol) of allyl n-decyl ether, 1.5 mol % of the metal carbonyl complex as indicated in Table 1 and 4 molt of diphenylsilane. The reaction vessel was sealed and immersed in an oil bath at the indicated temperature. Typically, polymerizations were conducted for 1 hour. The polymerization mixtures were cooled and terminated by the injection of a small amount of triethylamine. The polymers were dissolved in chloroform and analyzed by GC for residual allyl n-decyl ether with n-decane as the internal standard. The molecular weight of the polymer was determined by GPC. The data are accumulated in Table 1.

TABLE 1

Polymerization of Allyl n-Decyl Ether with Various Metal Carbonyl Complexes

| Metal Carbonyl[a,b] | Conversion (%) | Temperature (°C.) | $M_w$ (g/mol) | $M_n$ (g/mol) | $M_w/M_n$ |
|---|---|---|---|---|---|
| $Co_2(CO)_8$ | 92 | 25 | 38000 | 22000 | 1.7 |
| $Co_4(CO)_{12}$ | 90 | 110 | 26000 | 18000 | 1.4 |
| $Rh_6(CO)_{16}$ | 92 | 110 | 19000 | 11000 | 1.7 |
| $Ir_4(CO)_{12}$ | 89 | 180 | 18000 | 7000 | 2.6 |
| $Fe_3(CO)_{12}$ | 60 | 110 | 21500 | 12500 | 1.7 |
| $Fe_3(CO)_{12}{}^c$ | 88 | 110 | 13000 | 7000 | 1.9 |
| $Fe(CO)_5$ | 64 | 110 | 23700 | 14500 | 1.6 |
| $Fe(CO)_5{}^c$ | 89 | 110 | 13000 | 8500 | 1.5 |
| $Ru_3(CO)_{12}$ | 52 | 120 | 19800 | 13700 | 1.4 |
| $Ru_3(CO)_{12}{}^c$ | 88 | 120 | 9800 | 6000 | 1.6 |
| $Os_3(CO)_{12}$ | 60 | 180 | 23500 | 11100 | 2.1 |
| $Os_3(CO)_{12}{}^c$ | 87 | 180 | 8600 | 4500 | 1.9 |
| $Cr(CO)_6$, $Cr(CO)_6{}^c$ | 0,0 | 120,200 | N/A | N/A | N/A |
| $Re_2(CO)_{10}$, $Re_2(CO)_{10}{}^c$ | 0,10 | 120,200 | N/A | N/A | N/A |
| $W(CO)_6$, $W(CO)_6{}^c$ | 0,0 | 120,200 | N/A | N/A | N/A |
| $Mn_2(CO)_{10}$, $Mn_2(CO)_{10}{}^c$ | 0,8 | 120,200 | N/A | N/A | N/A |
| $Mo(CO)_6$, $Mo(CO)_6{}^c$ | 0,0 | 120,200 | N/A | N/A | N/A |
| $(Ph_3P)_2Ni(CO)_2$ | 0 | 120,200 | N/A | N/A | N/A |
| $(Ph_3P)_2Ni(CO)_2{}^c$ | 12 | 60 min at 120 a week at 25 | N/A | N/A | N/A |

[a] 1.5% metal carbonyl/1 h.
[b] 4 mol % diphenylsilane/1 h.
[c] 3 mol % metal carbonyl/1 h.

EXAMPLES 4–8

At room temperature, 0.5 g of each of the monomers shown in Table 2 was combined with $1.0 \times 10^{-5}$ mole dicobalt octacarbonyl and $8.4 \times 10^{-4}$ mole n-hexylsilane. Each of the monomers underwent facile exothermic polymerization. The resultant polymers were diluted with chloroform and then poured into ethanol to precipitate the polymer. The results are presented in Table 2, below.

TABLE 2

| MONOMER | RESULT |
|---|---|
| n-octyl allyl ether | liquid polymer, $M_n$ = 24,000, $M_n$ = 37,000 |
| n-decyl allyl ether | liquid polymer, $M_n$ = 1,000, $M_w$ = 2,600 |
| n-dodecyl allyl ether | liquid polymer, $M_w$ = ,800, $M_w$ = 2,400 |
| benzyl allyl ether | semisolid polymer, $M_n$ = 760, $M_w$ = 840 |
| ethylene glycol diallyl ether | crosslinked gel |

EXAMPLES 9–11

The following set of examples was carried out to determine the effect of variation in the concentration of dicobalt octacarbonyl on the polymerization of n-dodecyl allyl ether in the presence of 4 mole % methylphenylsilane as a cocatalyst. The results are presented in Table 3, below. The highest conversion was obtained using 1.5 mole % dicobalt octacarbonyl.

TABLE 3

| mole % $Co_2(CO)_8$ | % CONVERSION | $M_n$ | $M_w$ |
|---|---|---|---|
| 0.5 | 60 | 14,500 | 25,500 |
| 1.0 | 70 | 13,600 | 23,800 |
| 1.5 | 85 | 13,000 | 20,600 |

EXAMPLES 12–14

The following set of examples was carried out to determine the effect of variation in the type of silane cocatalyst on the polymerization of n-decyl allyl ether in the presence of 2 mole % dicobalt octacarbonyl. The results are presented in Table 4, below. Although mono-, di- and tri-substituted silanes were effective in polymerizing this monomer, the highest molecular weight polymers were obtained in the presence of phenylsilane.

TABLE 4

| SILANE | % CONVERSION | $M_n$ | $M_w$ |
|---|---|---|---|
| methylphenylsilane | 89 | 9,336 | 11,700 |
| tri-n-hexylsilane | 65 | 1,200 | 1,600 |
| phenylsilane | 75 | 11,800 | 16,000 |

EXAMPLES 15–17

The following set of examples was carried out to determine the effect of variation in the type of silane cocatalyst on the polymerization of n-octyl allyl ether in the presence of 1 mole % dicobalt octacarbonyl. The results are presented in Table 5, below. Again, while mono-, di- and tri-substituted silanes were effective in polymerizing this monomer, the highest molecular weight polymers were obtained in the presence of phenylsilane.

TABLE 5

| SILANE | % CONVERSION | $M_n$ | $M_n$ |
|---|---|---|---|
| methylphenylsilane | 62 | 13,000 | 15,600 |
| tri-n-hexylsilane | 32 | 1,100 | 2,560 |
| phenylsilane | 73 | 14,540 | 20,000 |

EXAMPLES 18–23

The following set of examples was carried out to determine the effect of variation in the concentration of dicobalt octacarbonyl on the polymerization of n-decyl allyl ether in the presence of 4 mole % methylphenylsilane. The results are presented in Table 6, below. While a wide variation in the concentration of dicobalt octacarbonyl is effective, polymerization of n-decyl allyl ether was optimized at 1.5 mole %.

TABLE 6

| mole % $Co_2(CO)_8$ | % CONVERSION |
|---|---|
| 0.5 | 62 |
| 1.0 | 78 |
| 1.5 | 90 |
| 2.0 | 69 |
| 2.5 | 78 |
| 3.0 | 72 |

EXAMPLE 24

POLYMERIZATION OF ALLYL ALCOHOL

Into a small vial, 17 mg ($5.0 \times 10^{-5}$ mole) of $Co_2(CO)_8$ was dissolved in 1.0 g of allyl alcohol. The vial was sealed with a rubber septum and then 19 ml ($1.02 \times 10^{-4}$ mole) of diphenylsilane was injected through the septum. Very rapid, exothermic polymerization took place after a few seconds induction period. After 1 hour, the polymerization was terminated by the injection of a small amount of triethylamine and the viscous polymer was subjected to analysis by $^1$H NMR.

The spectrum is consistent with the following structure:

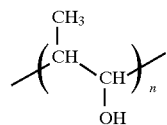

While this invention has been described in terms of specific embodiments, it should be understood that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A process for polymerizing an allyl ether, crotyl ether or allyl alcohol comprising bringing into reactive proximity:
   (a) a compound having at least one allyl ether, crotyl ether or allyl alcohol functional group;
   (b) a transition metal carbonyl complex catalyst; and
   (c) a cocatalyst having at least one silicon-hydrogen bond.

2. The process of claim 1 wherein said compound having at least one allyl ether, crotyl ether or allyl alcohol functional group; said transition metal carbonyl complex catalyst; and said cocatalyst having at least one silicon-hydrogen bond are mixed at a temperature sufficient to induce polymerization of said compound having at least one allyl ether, crotyl ether or allyl alcohol functional group.

3. The process of claim 1 wherein said transition metal carbonyl complex catalyst is chosen from the group consisting of carbonyl complexes of the Group VIII elements Rh, Ir, Ni, Fe, Ru, Os and Co.

4. The process of claim 3 wherein the transition metal carbonyl complex is chosen from the group consisting of $Co_2(CO)_8$ and $Co_4(CO)_{12}$.

5. The process of claim 4 wherein the transition metal carbonyl complex is $Co_2(CO)_8$.

6. The process of claim 1 wherein the cocatalyst is chosen from the group consisting of monoalkyl silanes, monoaryl silanes, dialkyl silanes, alkylaryl silanes, diaryl silanes, trialkyl silanes, dialkylaryl silanes, alkyldiaryl silanes, triaryl silanes, cyclic silanes, polymeric silanes, dichlorochlormethylsilane, 1,1,3,3-tetramethyldisiloxane, tetramethyldisilane, trichlorosilane and triethoxysilane.

7. The process of claim 6 wherein the cocatalyst is phenylsilane.

8. The process of claim 1 wherein bringing the elements (a), (b) and (c) into reactive proximity comprises mixing the transition metal carbonyl complex catalyst and the cocatalyst having at least one silicon-hydrogen bond prior to adding the compound having at least one allyl ether, crotyl ether or allyl alcohol functional group.

9. The process of claim 1 wherein bringing the elements (a), (b) and (c) into reactive proximity comprises mixing the transition metal carbonyl complex catalyst and the compound having at least one allyl ether, crotyl ether or allyl alcohol functional group prior to adding the cocatalyst having at least one silicon-hydrogen bond.

10. A curable composition kit comprising:
    (a) a compound having at least one allyl ether, crotyl ether or allyl alcohol functional group;
    (b) a transition metal carbonyl complex catalyst; and
    (c) a cocatalyst bearing at least one silicon-hydrogen bond.

11. The curable composition kit of claim 10 wherein the transition metal carbonyl complex catalyst is chosen from the group consisting of carbonyl complexes of the Group VIII elements Rh, Ir, Ni, Fe, Ru, Os and Co.

12. The curable composition kit of claim 11 wherein the transition metal carbonyl complex is chosen from the group consisting of $Co_2(CO)_8$ and $Co_4(CO)_{12}$.

13. The curable composition kit of claim 12 wherein the transition metal carbonyl complex is $Co_2(CO)_8$.

14. The curable composition kit of claim 10 wherein the cocatalyst is chosen from the group consisting of monoalkyl silanes, monoaryl silanes, dialkyl silanes, alkylaryl silanes, diaryl silanes, trialkyl silanes, dialkylaryl silanes, alkyldiaryl silanes, triaryl silanes, cyclic silanes, polymeric silanes, dichlorochlormethylsilane, 1,1,3,3-tetramethyldisiloxane, tetramethyldisilane, trichlorosilane and triethoxysilane.

15. The curable composition kit of claim 14 wherein the cocatalyst is phenylsilane.

* * * * *